Figure 1:
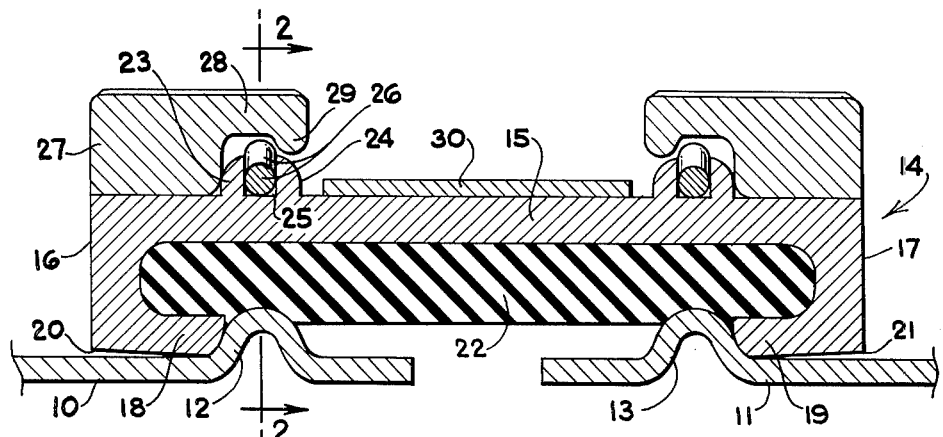

Aug. 7, 1962   G. A. MAHOFF ET AL   3,048,427
QUICK DISCONNECT SEGMENTAL TUBE COUPLING
Filed June 4, 1958

INVENTORS
GEORGE A. MAHOFF
LEONARD L. RICE
BY *Elliott & Pastoriza*
ATTORNEYS

United States Patent Office 3,048,427
Patented Aug. 7, 1962

3,048,427
QUICK DISCONNECT SEGMENTAL TUBE
COUPLING
George A. Mahoff, 1834 Old Orchard Road, and Leonard
L. Rice, 5608 Valley Glen, both of Los Angeles, Calif.
Filed June 4, 1958, Ser. No. 739,789
4 Claims. (Cl. 285—81)

This invention generally relates to a coupling for flexibly joining together opposing end portions of tubular members, and more particularly concerns a flexible tube coupling primarily adapted for aircraft and missile applications under conditions imposing variable and unusual pressure temperature requirements.

The present invention embodies certain of the features of applicant's co-pending application titled "Flexible Tube Coupling," filed April 23, 1958, and assigned Serial No. 730,305, and now abandoned.

Thus, the flexible tube coupling of the present invention is also designed to enable limited axial misalignment as well as a small degree of angular movement between the joined tubular members. Furthermore, the coupling of the present invention is also designed to withstand high pressures and temperature changes without structural failure or leakage.

In addition to the foregoing, in certain applications it is desirable to provide couplings of a unitary construction which may be readily assembled and disassembled on the joined tubular members without the necessity of removing the tubular members as such. In addition, it is desirable to provide a coupling that has a foolproof design such that it cannot be installed without all parts being properly connected together.

It is, therefore, an object of the present invention to provide a coupling which embodies as its principal coupling element a single structural assembly.

Another object of the present invention is to provide a flexible coupling which cannot physically be installed without a sealing member.

Still another object of the present invention is to provide a flexible coupling which enables a controlled amount of compression on the sealing member, thereby preventing cold flow, deterioration, and the possibility of ultimate failure of the sealing member.

Still another object of the present invention is to provide a flexible coupling, in accordance with the features of the coupling of applicant's co-pending application, which will withstand high pressure and high temperature conditions as well as enable axial misalignment and angular movement between the joined tubular members.

Still another object of the present invention is to provide a flexible coupling which is comprised of a minimum number of parts, and which is susceptible of economical manufacture and of a simplified installation procedure.

These and other objects and advantages of the present invention are generally achieved by providing a flexible coupling, according to the present invention, which is designed for connecting a first tubular member having an increased diameter portion to a second opposing tubular member. Normally, the increased diameter portion comprises a beaded or flared out section as conventionally provided at the end portion of tubular members designed for connection together.

The coupling includes annular retainer means which are dimensioned to be received over the increased diameter portion in radially spaced relationship therewith. The retainer means includes a reduced diameter portion which is designed for positioning on the first tubular member adjacent the outer side of the increased diameter portion or beaded section. Annular sealing means are interposed between the retainer means and the increased diameter portion, and holding means are coupled to the retainer means so as to urge the retainer means radially inwardly, whereby the sealing means is forcefully engaged with the increased diameter portion. In addition, of course, means are provided for coupling the retainer means to the other or second tubular member.

Figure 2:
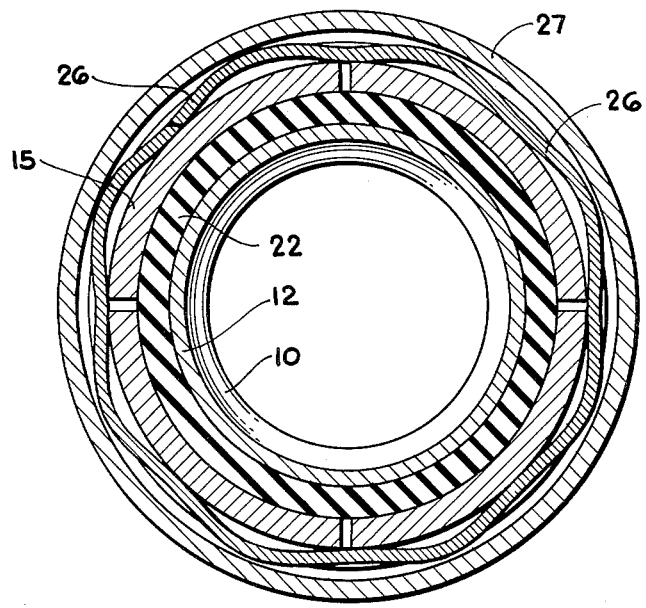

A better understanding of the present invention will be had by reference to the drawings showing merely one illustrative embodiment, and in which:

FIGURE 1 is an enlarged partial sectional view of the flexible coupling of the present invention; and, FIGURE 2 is a view taken in the direction of the arrow 2 of the coupling shown in FIGURE 1 with the entire cross section of the coupling and one of the tubular members being shown.

Referring now to the drawings, there is shown in FIGURE 1 a tubular member 10 and an opposing tubular member 11. The tubular member 10 has formed in its end portion an increased diameter portion or beaded section 12; similarly, the tubular member 11 has formed therein an increased diameter portion or beaded section 13.

Encircling the tubular members 10 and 11 is an annular retaining means, generally designated by the numeral 14, which includes a base portion 15 with radially inwardly extending sidewalls 16 and 17 terminating, respectively, in reduced diameter flanges 18 and 19. The base portion 15 defines with the sidewall 16 and flange 18 one C-shaped reduced diameter portion; similarly, the base portion 15 defines with the sidewall 17 and flange 19 another C-shaped reduced diameter portion. The flange 18 is designed to abut against the outer side of the bead 12 and has a minimum inner diameter substantially equal to the outer diameter of the tubular member 10. The flange 18 is further provided with an inner surface 20 of tapered cross section with the diameter thereof increasing slightly in a direction away from the bead 12 or the center line of the coupling. A taper of two to five degrees is usually sufficient to comply with alignment problems that will become clearer as the specification proceeds.

The flange 19 is similarly adapted to engage the outer side of bead 13 and is provided with an inner surface 21 which is gradually increased in diameter in a direction away from the bead 13 of the tubular member 11.

Since the coupling is designed the same on each axial side of its center line, the description of the other elements thereof may be limited to one section only.

Viewing the left hand portion of the coupling, as seen in FIGURE 1, the member 15 has extending radially outwardly therefrom a pair of opposed annular ridges 23 and 24 defining therebetween an annular groove 25. The groove 25 is designed to accommodate a spring wire 26 of a configuration more clearly shown in the view of FIGURE 2. The spring wire 26 is disposed in the groove 25 such that it extends radially outwardly a small distance beyond the ridges 23 and 24.

Encircling the left hand portion of the retainer means 14 is a holding means in the form of a lock ring 27 which includes an increased diameter portion 28. The increased diameter portion 28 is designed to fit over and encircle the spring wire 26 and to be interlocked therewith by a reduced diameter lip 29.

The retainer means 14 is further encircled by a force member in the form of a band clamp 30 which may or may not be included as a part of the final assembled coupling unit.

A further description of the elements and the manner in which they co-operate in the flexible coupling of the present invention may be effected by explaining the assembly procedure.

The annular retaining means is normally comprised of at least four arcuate sections each sub-tending an angle of approximately ninety degrees. Of course, it is conceivable to employ more sections, for example, six, and it is likewise feasible to employ fewer sections or to even make the annular retainer means as a split integral annular member. Certain advantages, however, accrue from forming the retainer means 14 as a plurality of arcuate sections as shown in FIGURE 2, rather than as a split integral member. With the former construction, a force distribution occurs circumferentially about the tubular members 10 and 11 which will result in more effective sealing not possible with a single annular retaining means. Furthermore, by employing separate arcuate sections, the sealing means or member 22 must be employed in order to hold the sections together in circular alignment. By employing arcuate sections, as shown in FIGURE 2, the retainer means 14 may have its arcuate members spaced circumferentially apart sufficiently to accommodate its positioning over the beads 12 and 13 before clamping force is applied.

Thus, in a preferred construction, the retainer means 14 is comprised of a plurality of arcuate sections which are first assembled together in circular alignment by forcing the resilient sealing member 22 over the flanges 18 and 19. For this purpose, the sealing member 22 must not only be formed over material sufficiently stable to withstand the possibility of chemical reaction with the fluid flowing through the tubular members 10 and 11, but also must be of a composition such that it is sufficiently resilient to flex over the flanges 18 and 19 and also form a seal with the beads 12 and 13.

After the seal 22 is assembled in the sections of the retainer means 14, the retainer means is then placed in position between the tubular members 10 and 11, and the tubular members are then forced axially into the retainer means 14 until the beads 12 and 13 are disposed within the retainer means, as shown in FIGURE 1. Thereafter, a band clamp or other force means is coupled around the retainer means 14, and more particularly to the member 15 thereof and tightened so as to force the sealing means 22 down into engagement with and over the beads 12 and 13, as a consequence of decreasing the inner circumference of the arcuate portions comprising the retainer means 15. As soon as the seal 22 is firmly engaged with the beads 12 and 13, as shown in FIGURE 1, the lock rings 27 are forced over the spring wires 26 to firmly stabilize the radially inwardly directed force on the sealing means 22. Towards this end, the inner diameter of the lock ring 27 is such that it cannot be passed over the portion 15 of the retainer means 14 until sufficient predetermined compression of the seal 22 has taken place. Thereafter, the band clamp 30 or other force means employed may be removed since the clamp 30 merely serves the temporary function of forcing the arcuate sections of the retainer 14 together and in turn the seal radially inwardly sufficiently to enable the lock rings 27 to be slipped on over the spring wires 26.

It will be appreciated that by providing the surfaces 20 and 21 of the flanges 18 and 19 with an outwardly increased taper, relative angular movement and axial misalignment of the tubular members 10 and 11 may be accommodated. In other words, the tubular member 10 may pivot to a limited extent about the area of contact between the inner edge of the flange 18 and its point of contact with the bead 12. A similar pivotal action is possible between the bead 13 and flange 19.

It will be appreciated that many changes and modifications may be made to the flexible coupling of the present invention without departing from the spirit and scope of the invention embodied therein as set forth in the following claims.

What is claimed is:

1. A flexible coupling for connecting a first tubular member having an increased diameter bead portion adjacent one end thereof and a second opposing tubular member, said coupling comprising: segmental annular retainer means dimensioned to be received over said bead portion in spaced relationship therewith, said retainer means including a reduced diameter end portion for pivotably contacting said first tubular member on the axially outer side of said bead portion, annular sealing means on the radially inner side of said retainer means for making sealing contact with said bead portion, said retainer means having on its outer circumference a spring holding means disposed axially inwardly of the outer end of said end portion, an annular spring disposed in said holding means for resiliently radially inwardly urging said retainer means and protruding radially outwardly of said holding means at a plurality of circumferential points, an annulus coaxially movable relative to said retaining means on and off over the axially outer end of the so resiliently urged retainer means for holding the retainer means in radially inwardly urged position, said annulus having a radially inwardly depending rounded nose spaced from said retainer means for cooperating with said spring at said points to effect releasable latching of the annulus around said retainer means, and means for sealingly coupling said retainer means to said second tubular member.

2. A coupling as in claim 1 wherein said retainer means end portion is reentrant to effect a substantially C-shaped cross section internally defining an annular recess, said annular sealing means extending into said recess and being held in place thereby, the radially inner surface of said end portion being tapered axially inwardly from a maximum diameter slightly greater than the outer diameter of said first tube to a minimum diameter substantially equal to said outer diameter.

3. A coupling for flexibly connecting first and second opposing tubular members each of which has adjacent its end an increased diameter bead portion, comprising a plurality of axially extending segmentally arcuate retainer members adapted to be assembled in spaced circumferential alignment, each end of each retainer member being decreased in diameter, two spring holding means disposed axially inwardly of opposite ends of said retainer members on the outer periphery thereof, two annular springs respectively for the said opposite end holding means for releasably holding said retainer members together and for urging said retainer members radially inwardly with their decreased diameter opposite ends in pivotal contact respectively with said tubular members on the axially outer side of the respective said bead portion, annular sealing means extending between opposite ends of said retainer members and on the radially inner side thereof for making sealing contact with the said bead portion of each of said tubular members, said springs extending radially outwardly of their respective said holding means at spaced circumferential points, and two annuli respectively for the opposite ends of said retainer members and axially movable relative thereto on and off around the axially outer ends thereof for securely holding the retainer members urged as aforesaid, each of said annuli having a radially inwardly depending rounded nose radially spaced from said retainer members for cooperating with a respective one of said springs at said spaced points to effect releasable latching of each said annulus around said retainer members.

4. A coupling as in claim 3 wherein each of said retainer members has each of its decreased diameter ends reentrant to effect a substantially C-shaped cross section internally defining an annular recess, said annular sealing means being a single annulus disposed in each of said recesses, the radially inner surface of each of said C-cross sections being tapered axially inwardly from a maximum radius slightly greater than the outer radius of the respective tube member to a minimum radius substantially equal to said outer radius.

(References on following page)

References Cited in the file of this patent

UNITED STATES PATENTS

| | | |
|---|---|---|
| 409,066 | Ravenel | Aug. 13, 1889 |
| 1,251,901 | McCulloch | Jan. 1, 1918 |
| 1,571,343 | Register | Feb. 2, 1926 |
| 2,067,428 | Wallis | Jan. 12, 1937 |
| 2,236,967 | Couty | Apr. 1, 1941 |
| 2,413,106 | Kelle | Dec. 24, 1946 |
| 2,460,984 | Hill et al. | Feb. 8, 1949 |
| 2,828,986 | Mahoff | Apr. 1, 1958 |
| 2,883,211 | Grass | Apr. 21, 1959 |

FOREIGN PATENTS

| | | |
|---|---|---|
| 714,600 | Great Britain | Sept. 1, 1954 |
| 1,106,161 | France | July 13, 1955 |